(12) United States Patent
Håland

(10) Patent No.: US 6,877,579 B1
(45) Date of Patent: Apr. 12, 2005

(54) SAFETY ARRANGEMENT FOR A MOTOR VEHICLE

(75) Inventor: Yngve Håland, Falsterbo (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/110,635

(22) PCT Filed: Oct. 13, 2000

(86) PCT No.: PCT/SE00/01983

§371 (c)(1),
(2), (4) Date: Aug. 14, 2002

(87) PCT Pub. No.: WO01/26922

PCT Pub. Date: Apr. 19, 2001

(30) Foreign Application Priority Data

Oct. 14, 1999 (GB) .................................... 9924365

(51) Int. Cl.⁷ ............................................... B60T 7/22
(52) U.S. Cl. ..................... 180/274; 180/282; 280/5.514
(58) Field of Search ................ 180/271, 282, 180/274; 280/5.507, 5.514, 6.157, 735; B60G 17/015

(56) References Cited

U.S. PATENT DOCUMENTS 2,892,636 A  6/1959 Walker
4,787,644 A * 11/1988 Yokote et al. ........... 280/6.157
4,852,863 A  8/1989 Breitenbacher et al.
5,116,077 A * 5/1992 Karnopp et al. ......... 280/5.502
5,217,246 A * 6/1993 Williams et al. ........ 280/5.507
5,348,113 A * 9/1994 Drvota et al. ................ 180/271
6,000,702 A * 12/1999 Streiter .................... 280/5.507
6,249,728 B1 * 6/2001 Streiter ........................ 701/37

FOREIGN PATENT DOCUMENTS

| EP | 0 304 618 A1 | 3/1989 |
| JP | 3-193519 A | 8/1991 |
| JP | 4-46814 A | 2/1992 |
| JP | 11170838 A | 6/1999 |
| JP | 11-348523 A | 12/1999 |
| WO | WO 00/15452 A1 | 3/2000 |

* cited by examiner

Primary Examiner—Paul N. Dickson
Assistant Examiner—Toan C To
(74) Attorney, Agent, or Firm—Venable LLP; Catherine M. Voorhees

(57) ABSTRACT

A mechanism is provided for lowering the height of the front part of a motor vehicle. A radar sensor is provided to sense the proximity of an adjacent vehicle. A signal is passed to a control unit which responds when a potential accident situation is detected. An output passes to a valve unit which is actuated to permit gas from an inflatable element to escape through a nozzle. As the gas escapes the element reduces in length, and a lowering housing element connected to a wheel of a vehicle moves upwardly into an upper housing element which is fixed to part of the structure of the vehicle. Thus, the front part of the vehicle is lowered so that the bumper on the vehicle is at an appropriate height.

10 Claims, 3 Drawing Sheets

SAFETY ARRANGEMENT FOR A MOTOR VEHICLE

BACKGROUND OF THE INVENTION

THE PRESENT INVENTION relates to a safety arrangement for a motor vehicle, and more particularly relates to a safety arrangement for a motor vehicle in the form of a light truck, pick-up truck, van or sport utility vehicle.

Many vehicles, in the form of motor cars for private use, are provided with front and rear bumpers, and may also be provided with side bumpers. Typically the bumpers on a motor vehicle are located at such a height above the road that the bumpers on the vehicle will engage the bumpers on another vehicle if the two vehicles are involved in an impact. Typically the bumpers are located substantially in alignment with the floor-pan of the vehicle, if the vehicle is of monocoque construction, or are located substantially in alignment with the chassis of the vehicle, if the vehicle has a discrete chassis.

The bumpers are thus positioned to receive the energy that is applied to a vehicle in an impact situation and to transfer the energy to the parts of the vehicle structure that have been designed to absorb the energy.

There are, at the present time, an increasing number of vehicles in use on the roads, which may be termed "high" vehicles, in which the vehicle is provided with substantial ground clearance, with the consequence that the bumpers provided on the vehicle are located at a much higher level above the road surface than the bumpers on a conventional vehicle. Examples of such "high" vehicles may include light trucks, pick-up trucks, vans and sport utility vehicles.

When a "high" vehicle of the type described above is involved in an impact with a conventional motor car, the bumper on the high vehicle is located substantially above the bumper on the conventional vehicle, and thus, in a frontal impact the bumpers do not engage.

FIG. 1 is a schematic illustration showing a high vehicle 1 about to be involved in a frontal impact with a conventional vehicle 2. It can be seen that the front bumper 3 of the high vehicle 1 is located substantially above the front bumper 4 of the conventional vehicle 2, so that during a frontal impact the front bumper 3 of the high vehicle 1 will ride over the front bumper 4 of the conventional vehicle 2. Thus substantial damage will be effected to the conventional vehicle 2, and the crumple zone provided in the conventional vehicle 2 may not operate in the intended manner.

If a high vehicle 1 is engaged with a side impact with a conventional vehicle 2, as shown in FIG. 2, very substantial damage can be effected to the conventional vehicle 2, since the bumper 3 of the high vehicle 1 will impact the conventional vehicle 2 at a level well above that of the floor pan 5 of the conventional vehicle 2. In such a situation the bumper 3 of the high vehicle 1 will engage the door or side panel 6 of the conventional vehicle 2, and it is to be envisaged that if the high vehicle 1 impacts the conventional vehicle 2 with a velocity in excess of a very low velocity, the door or side panel 6 will be driven inwardly into the interior of the conventional vehicle 2. An occupant of the conventional vehicle may thus be seriously injured.

It is to be understood, of course, that if a conventional vehicle is involved with a side impact with another conventional vehicle, the front bumper on the first conventional vehicle will be substantially at the level of floor pan 5 of the second vehicle.

SUMMARY OF THE INVENTION

The present invention seeks to provide a safety arrangement for a motor vehicle which will reduce or obviate the disadvantages of a conventional "high" vehicle of the type described above.

According to this invention there is provided a safety arrangement for a motor vehicle, the safety arrangement comprising means adapted to sense another vehicle within a predetermined range of the said vehicle and to generate a signal, and a component of the suspension of the vehicle of adjustable length, located between at least each front wheel of the vehicle, and a fixed part of the vehicle structure, the arrangement including adjustment means, responsive to the signal, to adjust the length of the said component of the suspension of the vehicle to lower at least the front part of the vehicle, relative to the ground, in response to the sensing of a potential accident situation.

The front part of the vehicle may be lowered by at least 100 mm, preferably by 150–250 mm, within a time period of 0.2 S.

Preferably a suspension unit is provided mounted between the axle or bearing of each front wheel of the vehicle and a fixed part of the structure of the vehicle, each suspension unit incorporating a said component of adjustable length, there being means to adjust the length of the element of adjustable length.

Conveniently the component of adjustable length comprises a chamber filled with a fluid, means being provided to permit fluid to escape from the chamber, thus reducing the overall length of the chamber, in response to the signal.

Advantageously the chamber comprises a resilient inflatable element, the inflatable element being connected by means of a duct to a valve unit, the valve unit being adapted, in response to said signal, to permit fluid to escape from the inflatable element.

Conveniently the inflatable element is located between two housing parts, the housing parts being movable telescopically relative to each other, but being distanced by the inflatable element, one housing part being connected to the fixed part of the structure of the vehicle, the other housing part being connected to the axle or bearing of the front wheel of the vehicle.

Preferably the inflatable element is filled with gas, such as air.

Conveniently a vacuum source is provided adapted to be connected, in response to said signal, to said inflatable element.

Advantageously means are provided to re-inflate the inflatable element when gas has been permitted to escape therefrom by the valve unit.

Preferably the means to inflate the inflatable element comprise a compressor unit adapted to supply compressed air to inflate the inflatable element.

In an alternative embodiment of the invention the component of adjustable length comprises a shock-absorber-and-spring combination.

Preferably the adjustment means comprise a piston and cylinder, and means to supply gas to the cylinder to move the piston in response to said signal.

Conveniently the means to supply gas comprises a pyrotechnic device.

Alternatively the spring is a torsion spring and the adjustment means are means to release part of the spring that is ordinarily fixed in position.

In a further modified embodiment of the invention component of adjustable length comprises an over-dead-centre linkage, the adjustment means being adapted to maintain the over-dead-centre linkage in a first condition and to move the dead-centre linkage to a second condition, in which the length of the over-dead-centre linkage is reduced, in response to said signal.

Conveniently the adjustment means comprises a piston and cylinder arrangement associated with a pyrotechnic charge adapted to supply gas to the cylinder to move the piston.

Advantageously the sensing means comprise a microwave radar.

Preferably the sensor is adapted to sense a parameter of the said another vehicle and to inhibit the generation of said signal or the operation of the adjustment means of said parameter is within predetermined limits.

In order that the invention may be more readily understood, and so that further features thereof may be appreciated, the invention will now be described, by way of example, with reference to the accompanying drawings in which:

DETAILED DESCRIPTION OF THE PREFERRED EMBODIMENTS

Figure 1:
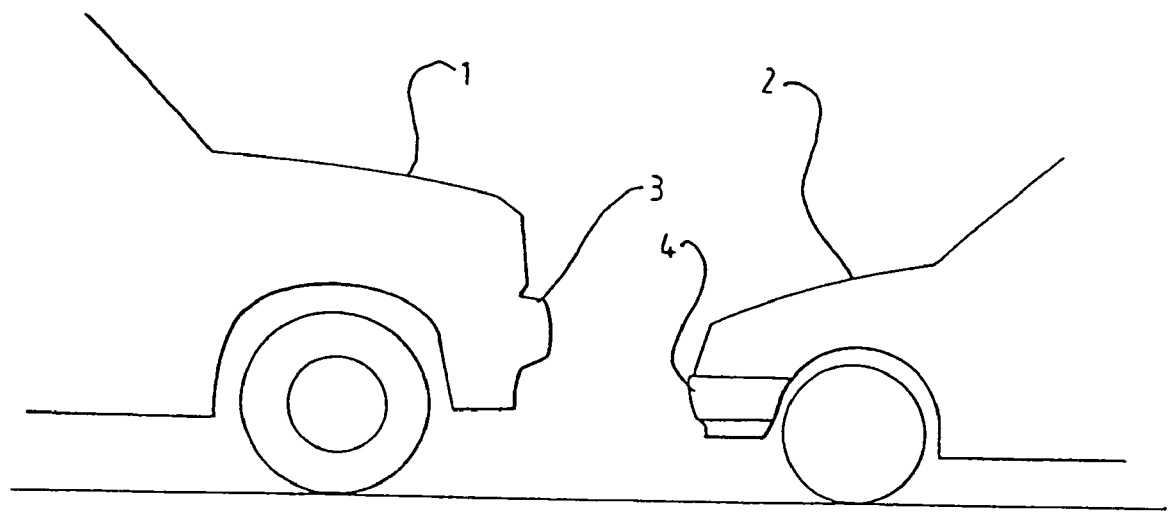
FIG. 1 is a diagrammatic view of a high vehicle and a conventional vehicle before a frontal impact.
Figure 2:
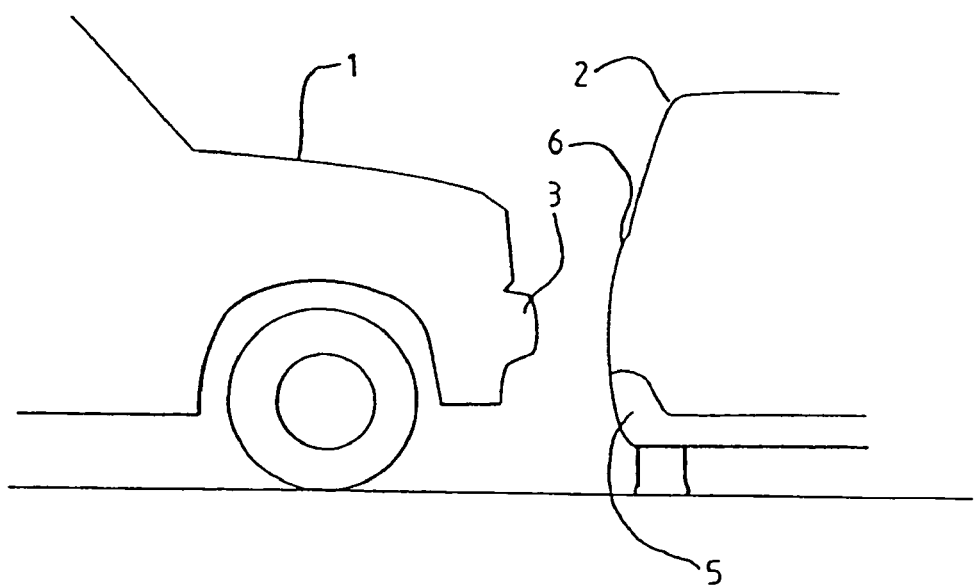
FIG. 2 is a diagrammatic view of a high vehicle and a conventional vehicle before a side impact.

FIGS. 1 and 2 have been described previously, and will not be discussed here.

Figure 3:
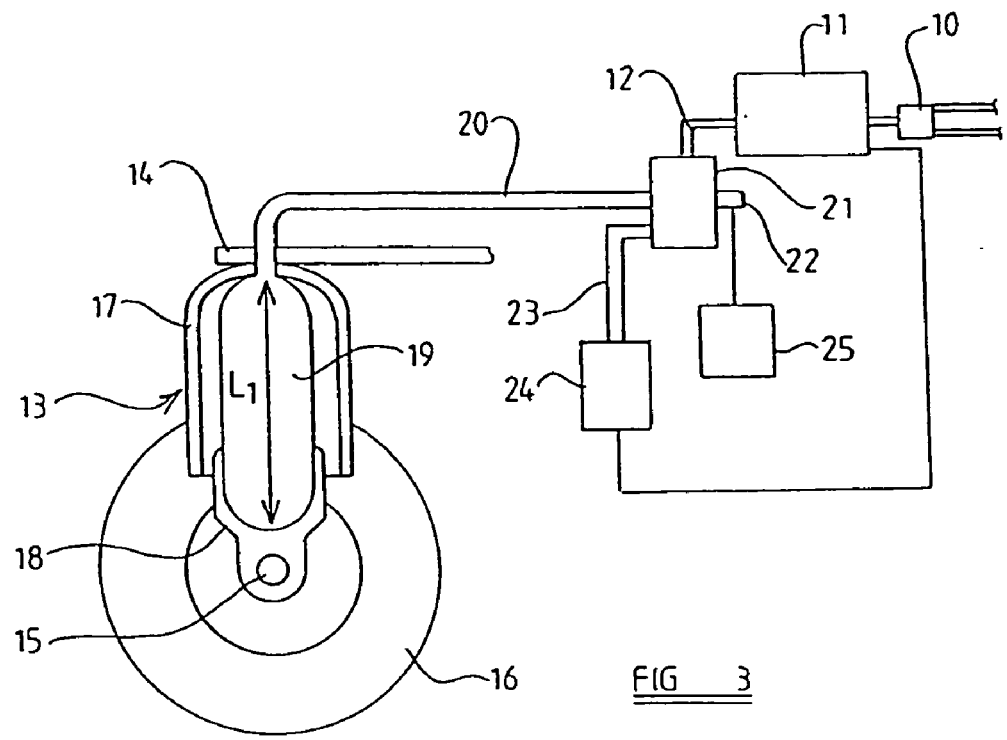
FIG. 3 is a diagrammatic view of one embodiment of a safety arrangement for a motor vehicle in accordance with the invention in a first condition.

Referring now to FIG. 3, one embodiment of a safety arrangement in accordance with the present invention is illustrated schematically.

At this stage it is to be understood that a safety arrangement in accordance with the invention includes a sensor system adapted to sense a potential accident situation, and also incorporates an adjustment mechanism which adjusts the effective length of a component of the vehicle suspension so that at least the front part of the vehicle is lowered. The front part of the vehicle will be lowered in a short period of time of the order of 200 ms (0.2 S) and the height of the bumper of the vehicle above the ground maybe lowered by at least 100 mm, and preferably by 150–250 mm.

Thus, as shown in FIG. 3, a sensor 10 is provided. In the described embodiment the sensor 10 is a radar sensor adapted to sense another vehicle within a predetermined range. The radar is a microwave radar and preferably a doppler radar capable of determining the closing speed of the vehicles. The radar may sense any other vehicle within a sensing area which extends 10 m forwardly of the vehicle and up to maximum of 4 m to either side of the centre line of the vehicle. However, further types of sensor may be used such as an optical sensor or an ultra-sonic sensor. The output of the sensor is connected to supply an output signal to a control unit 11. The control unit 11 is adapted to process signals from the sensor 10 and to determine when an accident situation is imminent.

In any event, the control unit 11 generates control signal on line 12 when a potential accident situation involving another vehicle is sensed.

The illustrated embodiment of the invention incorporates a suspension unit 13 which is connected between a fixed part 14 which constitutes part of the structure of the vehicle, and an axle or bearing 15 on which one of the front wheels 16 of the motor vehicle is mounted. Two identical suspension units of this type will be provided—one on each side of the vehicle.

The suspension unit includes an upper housing element 17 comprising a generally cylindrical chamber which is open at the bottom, the upper part of the chamber being connected to the part 14 of the vehicle structure, and a lower housing element 18, which is provided with an opening towards the top of the housing element. The housing element 18 is telescopically receivable within the upper housing element 17. The lower housing element is connected to the axle or bearing 15 associated with the wheel 16.

Contained within the housing defined by the two housing elements 17, 18 is a resilient inflatable element 19. The inflatable element 19 serves to distance the two housing parts 17, 18. The inflatable element 19 is, in this embodiment, adapted to be inflated with a fluid in the form of a gas, in particular air, which is supplied to the inflatable element 19 through a supply conduit 20. The supply conduit 20 is provided with a control valve arrangement 21 which can selectively connect the conduit 20 to an outlet nozzle 22, or to a supply conduit 23 which in turn is connected to a compressor 24. The nozzle 22 may be connected to a vacuum course 25, such as a substantially evacuated bottle.

It is to be appreciated that in an initial condition of the safety arrangement, as shown in FIG. 3, the inflatable element 19 has a predetermined length L1. Thus, there is a predetermined distance between the part 14 of the structure of the vehicle and the axle or bearing 15 of the wheel 16.

Figure 4:
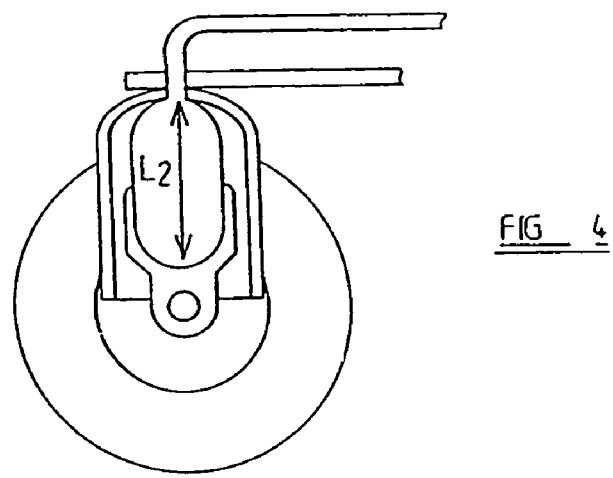
FIG. 4 is a diagrammatic view corresponding to part of FIG. 3 illustrating the safety arrangement of FIG. 3 in a second condition.

If the control unit 11 determines that a potential accident situation involving another vehicle is present, and provides control signal on the line 12, the valve unit 21 establishes a flow path from the conduit 20 to the outlet nozzle 22. Gas from the inflatable element 19 is thus forced out through the nozzle 22, and the volume of gas within the inflatable element 19 is reduced. Due to the weight of the vehicle pressing downwardly, the length L1 of the inflatable element is reduced to the lesser length L2 as shown in FIG. 4. The lower housing part 18 is telescopically received within the upper housing part 17. The distance between the fixed part 14 of the vehicle and the axle or bearing 15 supporting the wheel 16 is reduced. Thus the combination of the housing parts 17, 18 and the inflatable element 19 form a component of adjustable length and the valve unit acts to adjust the length of that component.

Figure 5:
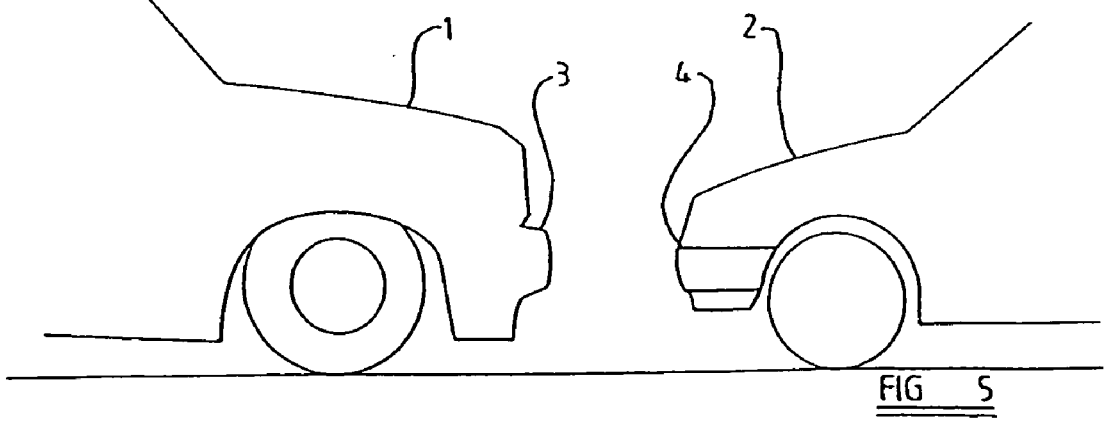
FIG. 5 is a view corresponding to FIG. 1 illustrating a high vehicle provided with a safety arrangement in accordance with the invention, and a conventional vehicle before a frontal impact.

As can be seen from FIG. 5, if a high vehicle 1, having a front bumper 3, provided with the safety arrangement as illustrated in FIGS. 3 and 4 is involved in a potential accident situation that may lead to a frontal impact, with another vehicle as soon as a potential accident situation is sensed, the valve unit 21 is adjusted so that gas from the inflatable element 19 may escape through the outlet nozzle 22, and the whole of the front part of the high vehicle 1 is lowered so that the bumper 3 of the high vehicle 1 is then at a level substantially in alignment with the front bumper 4 of a conventional vehicle 2.

The vehicle may take 200–300 ms to reach the lowered position. If the vacuum source 25 is connected to the nozzle 22, when the valve unit 21 is adjusted, gas will be rapidly withdrawn from the inflatable element 19 and the vehicle may reach the lowered position after a relatively short period of time.

Thus both of the vehicles are better able to withstand the impact with a reduced risk of injury occurring to the occupants of either of the vehicles, especially to the occupants of the conventional vehicle.

Figure 6:
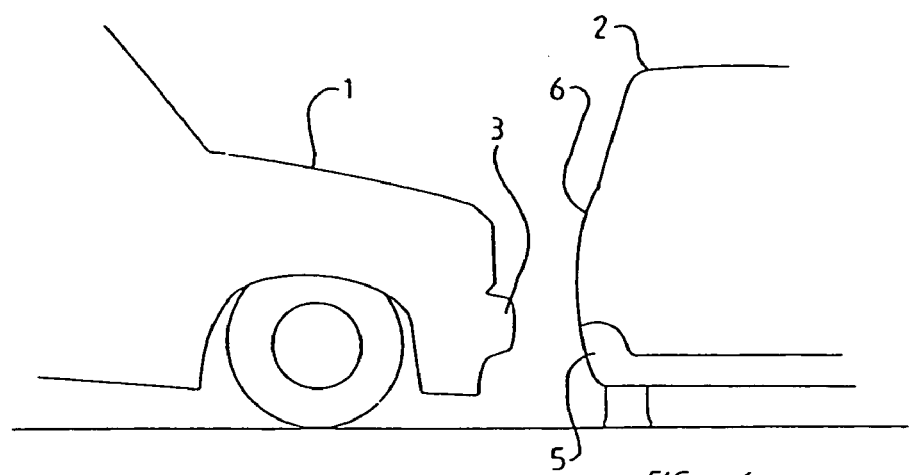
FIG. 6 is a view corresponding to FIG. 2 illustrating a high vehicle provided with a safety arrangement in accordance with the present invention, and a conventional vehicle before a side impact.

Referring to FIG. 6 it can be seen that if a high vehicle 1 provided with a safety arrangement as described with reference to FIGS. 3 and 4 is involved in a situation where there is the possibility of a side impact with a conventional vehicle 2, again the front part of the high vehicle 1 will be lowered so that the bumper 3 is substantially in alignment with the floor pan 5 of the conventional vehicle 2. Thus the risk of substantial damage being imparted to the conventional vehicle 2 is reduced.

It is to be appreciated that once the valve unit 21 has permitted gas to escape from the inflatable element 19, it will be necessary to replace that gas before the described safety arrangement is ready for re-use. Thus, in the embodiment of FIG. 3, a gas compressor 24 is provided to compress air and to supply that compressed air through the supply conduit 23 to the valve unit 21. The compressor and the valve unit are controlled by the control unit 11 to re-inflate the inflatable element 19 shortly after gas has been permitted to escape from the inflatable element 19 through the outlet nozzle 22 to restore the safety arrangement to a fully operative condition if no collision actually occurs. The compressor may re-evacuate the bottle of the vacuum source 25.

Whilst, in the embodiment described with reference to FIGS. 3 and 4, the suspension unit incorporates two telescopically mounted housing elements and an inflatable element located there-between, many alternative arrangements could be utilised. For example, the upper housing element may be replaced by a cylinder and the lower housing element may be replaced by a piston receivable within the cylinder, thus obviating the need for a separate inflatable element 19. The gas conduit 20 could simply be connected to the upper part of the cylinder.

Also, while the inflatable element described above, and the piston-and-cylinder arrangement have been described with reference to a gas, such as air, the inflatable element could be inflated with a fluid, such as oil, and a fluid such as oil could also be used in the piston and cylinder arrangement.

Figure 7:
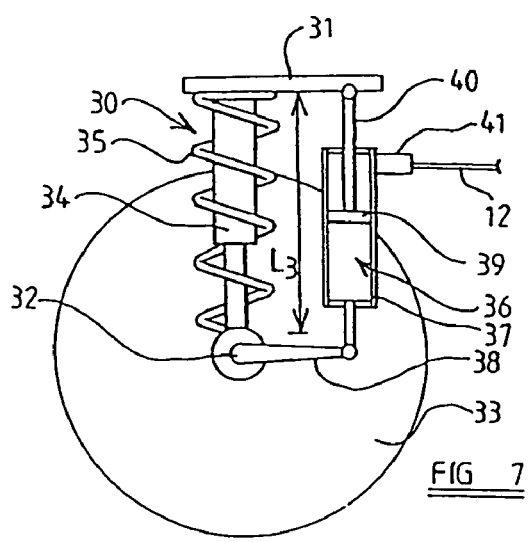
FIG. 7 is a diagrammatic view illustrating part of an alternative embodiment of the invention in one condition.
Figure 8:
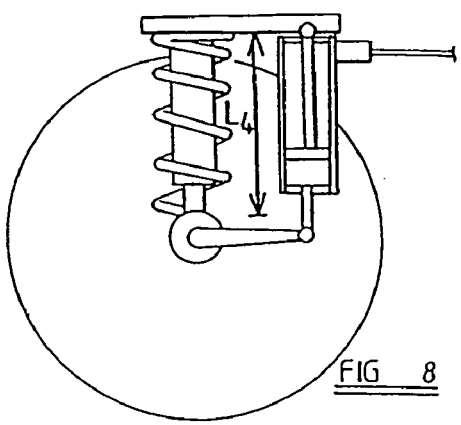
FIG. 8 is a view corresponding to FIG. 7 illustrating the said alternative embodiment in a second condition.

FIGS. 7 and 8 illustrate a modified embodiment of the invention. In this embodiment of the invention a suspension unit 30 is provided which is mounted in position between a fixed part 31 of the vehicle structure, and an axle or bearing 32 associated with a wheel 33. The suspension unit 30 incorporates a conventional shock-absorber 34 and an associated helical compression spring 35. Mounted in parallel with the shock-absorber-and-spring combination is a piston and cylinder unit 36. The cylinder 37 of the piston and cylinder unit 36 is connected, by means of a connecting element 38, to the axle or bearing 32 of the wheel 33. The piston 39 of the piston and cylinder unit 36 is connected, by means of a piston rod 40 to the fixed part 31 of the structure of the vehicle. A pyrotechnic unit 41 is provided which receives a signal on the line 12 from the control unit 11 as described with reference to FIG. 3.

It is to be appreciated that in ordinary use of the arrangement illustrated in FIG. 7, the shock-absorber-and-spring combination 34, 35, will function in the ordinary way and, in a typical situation there will be a distance of L3 between the fixed part 31 on the motor vehicle and the connecting element 38 connected with the axle or bearing 32 of the wheel 33.

In the event that a potential accident situation is sensed, a control signal will pass on line 12 to the pyrotechnic unit 41. Gas will be generated and supplied to the interior of the cylinder 37 of the piston and cylinder unit 36 above the piston 39. The piston 39 will be moved downwardly as shown in FIG. 8. This will serve to draw together the connecting element 38 and the fixed part 31 of the structure of the motor vehicle so that the distance between the element 38 and the fixed part 31 is a reduced distance of LA. A ratchet arrangement may be provided to retain the piston in position, thus maintaining the distance LA between the element 38 and the fixed part 31. Thus, in this embodiment of the invention, in response to a potential accident situation, the length of the component consisting of the shock-absorber-and-spring combination is reduced, thus lowering the entire front part of the vehicle.

Figure 9:
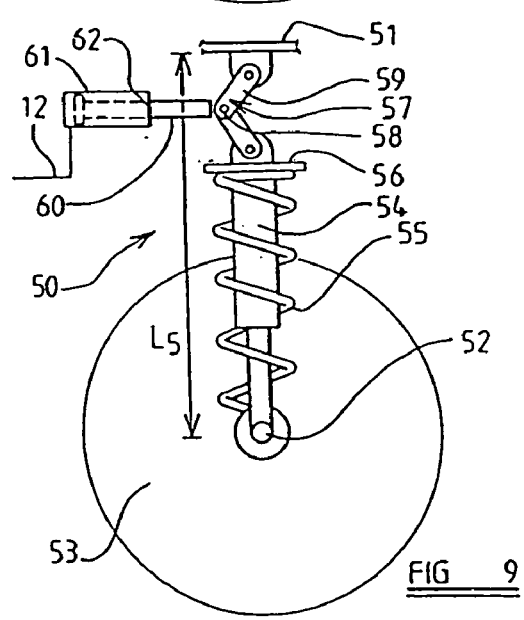
FIG. 9 is a diagrammatic view of part of a further embodiment of the invention in a first condition.

FIG. 9 illustrates a further modified embodiment of the invention. In this embodiment of the invention a suspension unit 50 is provided which is mounted between a fixed part 51 of the structure of the vehicle and an axle or bearing 52 associated with a wheel 53 of the vehicle. The suspension unit 50 is constituted by a shock-absorber 54 associated with a helical compression spring 55 which is connected between the axle or bearing 52 associated with the wheel 53 and an intermediate element 56. The intermediate element 56 is connected to the fixed part 51 of the structure of the vehicle by means of an over-dead-centre linkage 57. The over-dead-centre linkage is a component of adjustable length. The over-dead-centre linkage 57 is constituted by a first lower lever arm 58 and a second upper lever arm 59 of equal length. The lower lever arm 58 is pivotally mounted at its lower end, on the intermediate element 56. The upper end of the lower lever 58 is pivotally connected to the lower end of the upper lever arm 59. The upper end of the upper lever arm 59 is pivotally connected to the fixed part 51 of the structure of the motor vehicle.

As shown in FIG. 9, the two lever arms 58, 59 are in an initial position, close to the dead-centre position, in which they abut a plunger 60 which is connected to a piston 61, the piston 61 being contained within a cylinder 62. In the condition illustrated in FIG. 9 the plunger 60 prevents the point of pivotal connection of the two lever arms 58 and 59 moving further towards the left, thus serving to maintain a distance L5 between the part 51 of the structure of the vehicle and the axle or bearing 52 associated with the wheel 53.

Figure 10:
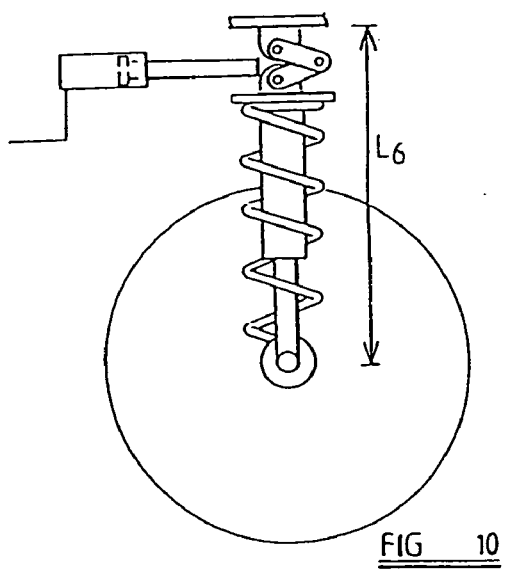
FIG. 10 is a diagrammatic view corresponding to FIG. 9 showing the illustrated part of the further embodiment in a second condition.

The cylinder 62 contains a pyrotechnic charge and is adapted to receive a control signal along line 12 which is associated with the control unit 11 as described above with reference to FIG. 3. In response to a potential accident situation being sensed, the pyrotechnic charge within the cylinder 62 is ignited, thus moving the plunger 60 towards the right as shown in FIG. 10. The plunger 60 engages the lever arms 58, 59, moving the lever arms through the dead-centre position. Once the lever arms have moved through the dead-centre position, the lever arms are free to collapse, as shown in FIG. 10, and thus the distance between the fixed part 51 of the structure of the vehicle and the axle or bearing 52 associated with the wheel 53 is reduced to the distance L6.

Thus, again, in the embodiment of FIGS. 7, 8, 9 and 10 in response to a potential accident situation being sensed, the entire front part of the vehicle is lowered.

In a further alternative embodiment of the invention the suspension of the vehicle may be constituted by a torsion bar in combination with a shock absorber instead of by a helical spring in combination with a shock absorber. Such a torsion bar will have one end fixed to the vehicle, and a relatively long part of the torsion bar which is twisted to provide torsion. The other end of the torsion bar is provided with a radially extending arm which, because of the "twist" in the torsion bar applies an appropriate force to the axle or bearing of the wheel. As the axle or bearing of the wheel moves upwardly and downwardly, so the degree of "twists" in the torsion bar changes. It is envisaged that if a torsion bar is utilised, the part of the torsion bar remote from the wheel that is ordinarily fixed to the structure of the vehicle will actually be fixed to the structure of the vehicle by a releasable mechanism. The releasable mechanism will be released in response to a signal, such as the signal on line 12 as described above, and this will effect an adjustment of the length of the shock absorber, effecting a lowering of at least the front part of the vehicle.

Whilst the invention has been described with reference to certain preferred embodiments, it is to be appreciated that many modifications may be made without departing from the scope of the invention. For example, the sensor 10 may be adapted to determine a parameter of the sensed vehicle, such as the height or size of the vehicle. If the sensed vehicle is another "high" vehicle, it would not be appropriate to lower the vehicle provided with the sensor. Thus, in response to a determination of a parameter of the sensed vehicle the generation of the output signal as passed to the control unit may be inhibited, or the generation of the control signal by the control unit is inhibited so that the vehicle is not lowered.

Whilst reference has been made to the front part of the vehicle being lowered in response to a potential accident situation being sensed, it is possible that the entire vehicle may be lowered.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A safety arrangement for a motor vehicle, the safety arrangement comprising an arrangement adapted to sense another vehicle within a predetermined range of the said vehicle and to generate a signal, and a suspension component of the vehicle of adjustable length, located between at least each front wheel of the vehicle and a fixed, structural part of the vehicle, the arrangement including an adjustment mechanism, responsive to the signal, to adjust the length of the said suspension component of the suspension of the vehicle to lower at least a front part of the vehicle, relative to the ground, in response to the sensing of a potential accident situation wherein the component of adjustable length comprises a chamber filled with gas, and means being provided to permit gas to escape from the chamber, thus reducing the overall length of the chamber, in response to the signal.

2. An arrangement according to claim 1 wherein a suspension unit is provided between an axle or bearing of each front wheel of the vehicle and a fixed structural part of the vehicle, each suspension unit incorporating a said suspension component of adjustable length.

3. An arrangement according to claim 2 wherein the chamber comprises a resilient inflatable element, the inflatable element being connected by means of a duct to a valve unit, the valve unit being adapted, in response to said signal, to permit gas to escape from the inflatable element.

4. An arrangement according to claim 3 wherein the inflatable element is located between two housing parts, the housing parts being movable telescopically relative to each other, but being distanced by the inflatable element, one housing part being connected to the fixed part of the structure of the vehicle, the other housing part being connected to the axle or bearing of the front wheel of the vehicle.

5. Arrangement according to claim 3 wherein a vacuum source is provided adapted to be connected, in response to said signal, to said inflatable element.

6. An arrangement according to claim 1 wherein a compressor is provided to restore the safety arrangement to a fully operative condition after gas has been permitted to escape from the chamber by the valve unit.

7. An arrangement according to claim 1 wherein the arrangement for sensing another vehicle comprises a microwave radar.

8. An arrangement according to claim 1 wherein the arrangement for sensing another vehicle is adapted to sense a parameter of the said another vehicle and to inhibit the generation of said signal or the operation of the adjustment means if said parameter is within predetermined limits.

9. A safety arrangement according to claim 1, wherein the adjustment mechanism lowers a part of the vehicle in the range of approximately 100–250 mm.

10. The safety arrangement according to claim 9, wherein the part of the vehicle is lowered in approximately 200–300 ms (0.2–0.3 S).

* * * * *